UNITED STATES PATENT OFFICE.

JACOB REESE, OF PITTSBURG, PENNSYLVANIA.

AMMONIATED PHOSPHATE.

SPECIFICATION forming part of Letters Patent No. 450,253, dated April 14, 1891.

Application filed February 18, 1889. Serial No. 300,293. (No specimens.)

*To all whom it may concern:*

Be it known that I, JACOB REESE, a citizen of the United States, residing at Pittsburg, Pennsylvania, have invented a new and useful Improvement in Ammoniated Phosphates; and I declare the following to be a full, clear, and exact description thereof.

Heretofore in the manufacture of ammoniacal phosphatic fertilizer, bones, Charleston rock, or other material containing phosphoric acid was admixed with salts of ammonia and then treated with sulphuric acid, or the phosphates and ammonia salts were treated separately with sulphuric acid and then united. I have discovered that by pulverizing calcareous phosphatic basic slag such as produced in the practice of the Reese basic process for the manufacture of steel and admixing it with ground ammoniacal salts—such as sulphate of ammonia—or with other material containing ammonia a first-class ammoniated phosphate is produced without the use of sulphuric acid. The mixing may be done in a dry way at ordinary temperature, and thus avoid the furnace-heating sometimes resorted to. The calcareous phosphatic basic slag contains from fifteen to thirty per cent. of phosphoric acid, usually about twenty per cent., and by admixing the proper amount of ammoniacal salts with it an ammoniacal phosphate may be produced having any desired proportion of phosphoric acid and ammonia. The ammoniated phosphate so made will be dry and free from sulphuric acid, and will contain a greater percentage of plant-food than any ammoniated fertilizer known to me.

In pulverizing the calcareous phosphatic basic slag care should be taken to eliminate all particles of metallic iron, as the iron is injurious to the machine and objectionable as plant-food. The slag should be ground or pulverized to a state of fine powder.

What I claim as my invention, and desire to secure by Letters Patent, is—

1. A fertilizer composed, essentially, of pulverized calcareous phosphatic basic slag and salts of ammonia, as set forth.

2. A fertilizer composed, essentially, of pulverized calcareous phosphatic basic slag and ammonia, as set forth.

JACOB REESE.

Witnesses:
  JOHN C. PENNIE,
  HERBERT W. ELMORE.